United States Patent
Mashimo et al.

(10) Patent No.: US 10,187,165 B2
(45) Date of Patent: Jan. 22, 2019

(54) WIRELESS COMMUNICATION TERMINAL, WIRELESS COMMUNICATION SYSTEM, AND COMMUNICATION CONTROL METHOD

(71) Applicant: Hitachi, Ltd., Chiyoda-ku, Tokyo (JP)

(72) Inventors: Daisuke Mashimo, Tokyo (JP); Hideki Endo, Tokyo (JP); Hiroyuki Kubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 15/438,988

(22) Filed: Feb. 22, 2017

(65) Prior Publication Data

US 2017/0359131 A1 Dec. 14, 2017

(30) Foreign Application Priority Data

Jun. 13, 2016 (JP) .................................. 2016-116866

(51) Int. Cl.

| | |
|---|---|
| *H04B 17/309* | (2015.01) |
| *H04L 29/08* | (2006.01) |
| *H04W 24/08* | (2009.01) |
| *H04W 48/18* | (2009.01) |
| *H04L 29/06* | (2006.01) |
| *H04W 88/08* | (2009.01) |

(52) U.S. Cl.
CPC ........... *H04B 17/309* (2015.01); *H04L 69/14* (2013.01); *H04L 69/323* (2013.01); *H04L 69/324* (2013.01); *H04W 24/08* (2013.01); *H04W 48/18* (2013.01); *H04W 88/08* (2013.01)

(58) Field of Classification Search
CPC .... H04B 17/309; H04W 24/08; H04W 88/08; H04L 69/324; H04L 69/323
USPC ......................................... 370/252, 310, 401
See application file for complete search history.

(56) References Cited

U.S. PATENT DOCUMENTS

| | | | |
|---|---|---|---|
| 6,414,943 B1 * | 7/2002 | Hwang | ............... H04W 52/343 370/310 |
| 2009/0016366 A1 * | 1/2009 | Endo | ...................... H04L 45/00 370/401 |

(Continued)

FOREIGN PATENT DOCUMENTS

| | | |
|---|---|---|
| JP | 2000-174770 A | 6/2000 |
| JP | 2001-36585 A | 2/2001 |
| JP | 2015-95870 A | 5/2015 |

*Primary Examiner* — Kwang B Yao
*Assistant Examiner* — Syed M Bokhari
(74) *Attorney, Agent, or Firm* — Crowell & Moring LLP

(57) ABSTRACT

To stabilize data communication with a small delay while keeping communication cost low, it is provided a wireless communication terminal, which is capable of coupling to a plurality of wireless communication systems, comprising: a transmission buffer configured to store data to be transmitted; a determination module configured to determine communication quality of the plurality of wireless communication systems based on a result of comparison between an amount of data stored in the transmission buffer and a given threshold; a selection module configured to control a number of wireless communication systems to be used to transmit data, based on a result of the determination of the communication quality; and at least one wireless interface configured to transmit data via the controlled number of wireless communication systems.

8 Claims, 16 Drawing Sheets

(56) References Cited

U.S. PATENT DOCUMENTS

| | | | |
|---|---|---|---|
| 2013/0183988 A1* | 7/2013 | Zhang | H04W 72/1215 455/450 |
| 2014/0126399 A1* | 5/2014 | Damnjanovic | H04W 72/1252 370/252 |
| 2016/0219024 A1* | 7/2016 | Verzun | H04L 63/102 |

* cited by examiner

| 201 | 202 | 200 |
|---|---|---|
| IF ID | BUFFER AMOUNT | |
| A | 100 | |
| B | 0 | |
| C | 0 | |
| ⋮ | ⋮ | |

Fig. 4

| 301 | 302 | 303 | 300 |
|---|---|---|---|
| IF ID | LOW QUALITY-TIME SPECIFICATION INFORMATION | USE SPECIFICATION INFORMATION | |
| A | SPECIFIED | IN USE | |
| B | SPECIFIED | NOT USED | |
| C | NOT SPECIFIED | NOT USED | |
| ⋮ | ⋮ | ⋮ | |

Fig. 5

| 401 | 402 | 400 |
|---|---|---|
| IF ID | USE SPECIFICATION INFORMATION | |
| A | IN USE | |
| B | NOT USED | |
| C | NOT USED | |
| ⋮ | ⋮ | |

Fig. 6

| DATA TYPE | PRIORITY LEVEL |
|---|---|
| IMAGE | PRIORITIZED |
| ACCELERATION | PRIORITIZED |
| TEMPERATURE | GENERAL |
| HUMIDITY | GENERAL |

*Fig. 12*

WIRELESS COMMUNICATION TERMINAL, WIRELESS COMMUNICATION SYSTEM, AND COMMUNICATION CONTROL METHOD

CLAIM OF PRIORITY

The present application claims priority from Japanese patent application JP 2016-116866 filed on Jun. 13, 2016, the content of which is hereby incorporated by reference into this application.

BACKGROUND OF THE INVENTION

This invention relates to a wireless communication terminal configured to selectively transmit data on a plurality of routes.

In recent years, expectations are rising for Internet-of-Things (IoT) services in which automatic recognition, automatic control, remote measurement, and the like are executed through connection to the Internet from, and communication between, various "things" that are not computers or other information/communication devices but have a communication function. As one mode of such IoT services, automobiles or other mobile objects with a wireless communication device installed therein function as mobile communication terminals to transmit/receive data to/from a cloud (servers and storage apparatus). Telecommunication carriers provide metered-rate wireless communication services intended for this mode of IoT services that use an existing wide-coverage cellular network.

Use cases of IoT services of the mode described above include one in which a mobile communication terminal transmits sensing data and the like to the cloud in real time, and is controlled by the cloud based on a result of analysis of the data. For example, in a remote control service where sequential images obtained by a camera that is installed in an automobile are transmitted to the cloud, and an operator on the cloud side uses the sequential images to determine how the automobile is to be controlled, the transmitted images need to reach the cloud with a one-way delay that is on the order of several ten milliseconds because the environment surrounding the automobile changes moment by moment. One of technologies that fulfill this requirement is multi-root communication, which uses a plurality of routes (for example, communication systems run by different telecommunication carriers) to transmit copies of the same data, and in which the receiver side identifies and discards a redundant packet. Use of a plurality of different telecommunication carriers simultaneously and receiving data in the order of arrival on the receiver side guarantees communication with a small delay. However, this manner of communication, which always uses a plurality of different telecommunication carriers simultaneously, increases the amount of communication data and raises communication cost. To avoid those problems, multi-root control technology is needed, which selects a plurality of wireless communication systems for use in data transmission only when necessary.

Examples of the related art for selecting communication systems to be used from among a plurality of options include JP 2000-174770 A, JP 2015-95870 A, and JP 2001-36585 A.

In JP 2000-174770 A, there is disclosed a wireless data communication apparatus configured to conduct wireless data communication with the use of a plurality of lines by multi-linking. The wireless data communication apparatus includes a stabilizing unit configured to select lines by switching data paths based on monitoring information that is obtained from the monitoring of states of lines.

In JP 2015-95870 A, there is disclosed a communication apparatus including: buffer information collecting means for collecting transmission buffer information, which indicates the amount of transmission data accumulated in a transmission buffer of a mobile station; throughput information collecting means for collecting transmission throughput information, which indicates the transmission data rate of the mobile station; a communication information database for storing, as communication information, the transmission buffer information and the transmission throughput information in association with information on a time and a train position at which the transmission buffer information and the transmission throughput information have been collected; and transmission data sorting means for sorting, when data is received from a user terminal on the train, for transmission, the data into mobile stations based on at least two pieces of communication information that are associated with a time and a train position at which the data has been received.

In JP 2001-36585 A, there is disclosed a communication system in which a transmission unit of a transmission-side terminal transmits data bound to a reception-side terminal to a gateway transmission apparatus, a reception unit of the gateway transmission apparatus receives the data bound to the reception-side terminal, a selection unit of the gateway transmission apparatus selects one of a plurality of communication paths, and a transmission unit of the gateway transmission apparatus transmits the data bound to the reception-side terminal over the selected communication path to a gateway reception apparatus. When selecting a communication path, the selection unit takes into account the amount of data to be transmitted, the usage amount of a transmission buffer associated with a communication path, the line speed of an access zone, and a transmission delay time that is measured or otherwise obtained and stored in advance. The reception unit of the gateway reception apparatus receives the data bound to the reception-side terminal, and the transmission unit of the gateway reception apparatus transmits to the reception-side terminal the data bound to the reception-side terminal. In a case where it is necessary to take into account the order of the data bound to the reception-side terminal, the data is put into order by suspending the transmission of the data bound to the reception-side terminal as needed. A reception unit of the reception-side terminal receives the data bound to the reception-side terminal.

SUMMARY OF THE INVENTION

In order to provide the remote driving service described above or other delay-sensitive IoT services, stable data communication with a small delay needs to be achieved even when the quality of wireless communication fluctuates greatly, by controlling an upstream communication path along which data travels from a mobile communication terminal to the cloud with a small delay (for example, a delay on the order of several ten milliseconds). In JP 2000-174770 A, where multi-route selection is based on statistical parameters related to the condition of wireless communication, measurement on the order of several seconds is required to obtain statistical information. Therefore, with the technology disclosed in JP 2000-174770 A, a rapid change in wireless communication environment cannot be dealt with. In JP 2015-95870 A, the communication system to be used is selected based on past history information. In JP 2001-36585 A, while packet size and other real time parameters are used, the dominant factor is a transmission delay that is information measured in advance. Control in JP 2015-95870 A and JP 2001-36585 A thus uses history information that is at least several seconds old. In short, the related art is not capable of providing stable data communication with a small delay through multi-route control that is adapted to changes in communication quality.

It is therefore an object of this invention to provide stable data communication with a small delay by performing multi-route control based on changes in communication quality in terms of a delay in data transmission from a wireless communication terminal.

The representative one of inventions disclosed in this application is outlined as follows. There is provided a wireless communication terminal, which is capable of coupling to a plurality of wireless communication systems, comprising: a transmission buffer configured to store data to be transmitted; a determination module configured to determine communication quality of the plurality of wireless communication systems based on a result of comparison between an amount of data stored in the transmission buffer and a given threshold; a selection module configured to control a number of wireless communication systems to be used to transmit data, based on a result of the determination of the communication quality; and at least one wireless interface configured to transmit data via the controlled number of wireless communication systems.

According to one embodiment of this invention, stable data communication with a small delay can be accomplished while keeping communication cost low. Other objects, configurations, and effects than those described above are revealed in descriptions of embodiments of this invention given below.

BRIEF DESCRIPTION OF THE DRAWINGS

The present invention can be appreciated by the description which follows in conjunction with the following figures, wherein:

FIG. 4 is an explanatory diagram illustrating a transmission buffer information table included in a communication quality determining module according to the first embodiment of this invention;

FIG. 5 is an explanatory diagram illustrating a wireless IF management table included in a communication path selecting module according to the first embodiment of this invention;

FIG. 6 is an explanatory diagram illustrating a copy processing information table included in a copy processing module according to the first embodiment of this invention;

FIG. 12 is an explanatory diagram illustrating a priority level determining table included in a priority level determining module according to the first embodiment of this invention;

DETAILED DESCRIPTION OF THE PREFERRED EMBODIMENTS

In the following, embodiments of this invention are described with reference to the drawings.

Figure 1:
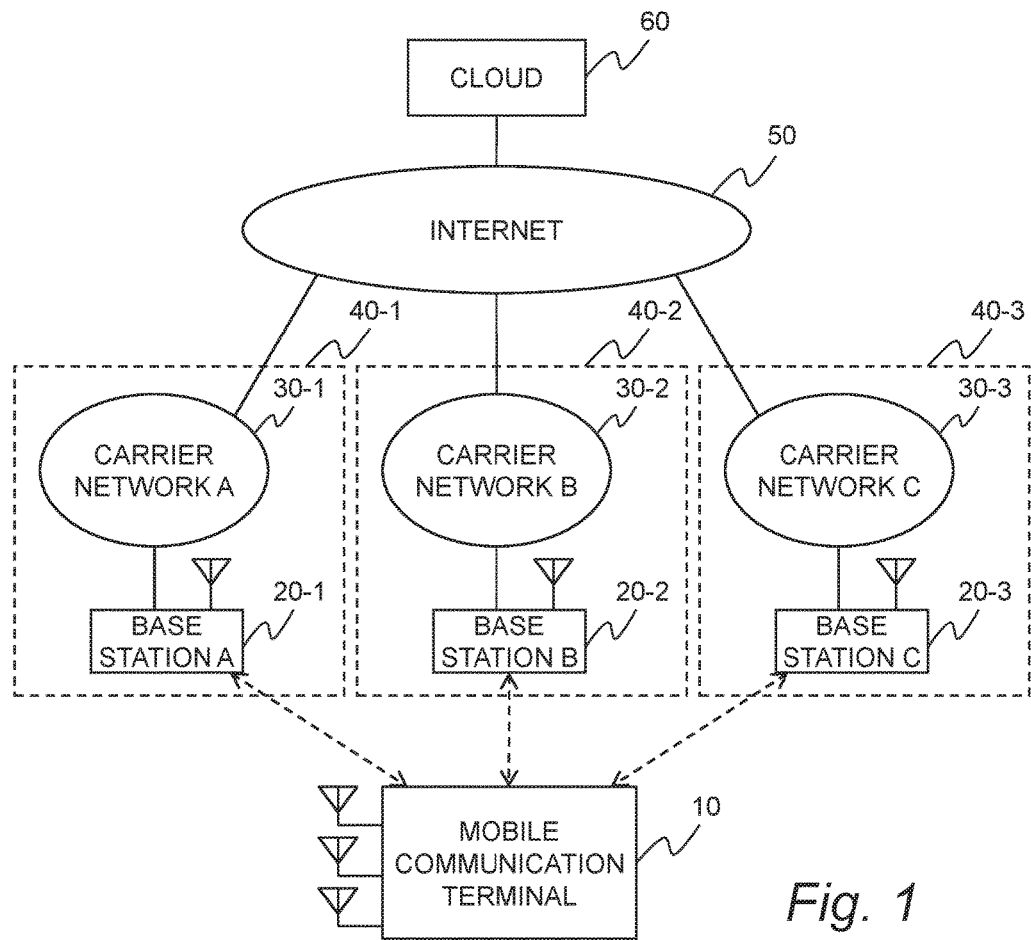
FIG. 1 is a diagram illustrating a configuration of a communication system according to embodiments of this invention.

FIG. 1 is a diagram of a configuration of a communication system according to the embodiments of this invention.

In the communication system of the embodiments of this invention, a mobile communication terminal 10 couples to an Internet 50 via wireless communication systems 40-1 to 40-3, which include base stations 20-1 to 20-3 and carrier networks 30-1 to 30-3 run by a plurality of different communication carriers A to C, respectively, to conduct data communication to and from a cloud 60. The base stations 20-1 to 20-3 are collectively referred to as "base stations 20" when one is not discriminated from another. The carrier networks 30-1 to 30-3 are collectively referred to as "carrier networks 30" when one is not discriminated from another. The wireless communication systems 40-1 to 40-3 are collectively referred to as "wireless communication systems 40" when one is not discriminated from another.

The mobile communication terminal 10 in the embodiments of this invention transmits data on a plurality of routes running through the carrier networks 30 of a plurality of different communication carriers. Each carrier network 30 communicates to and from the mobile communication terminal 10 via a different base station 20. The carrier networks 30 can be networks that are provided by different telecommunication carriers and that have the same communication protocol (for example, LTE), or networks that are provided by the same telecommunication business and that have different communication protocols (for example, LTE and 3G).

The mobile communication terminal 10 uses an installed application program to transmit and receive data to and from the cloud 60 so that IoT services are provided to a user. The mobile communication terminal 10 can be coupled to the wireless communication systems 40-1 to 40-3 run by a plurality of different communication carriers, and switches the number of wireless communication systems 40 to be used for upstream communication to a number determined by the quality of communication (particularly in terms of delay). The mobile communication terminal 10 assigns a sequence number to transmission data before transmitting the data. In the case of multi-route communication, the mobile communication terminal 10 makes copies of the same data and transmits the copies via a plurality of wireless communication systems 40.

Each wireless communication system 40 includes a base station 20 configured to conduct radio wave communication to and from the mobile communication terminal 10, and a carrier network 30, which is a backbone network that couples between a plurality of base stations 20 and couples the base stations 20 to the Internet 50. The wireless communication system 40 is, for example, a cellular network.

The cloud 60 is made up of a group of servers in a data center, and transmits and receives data to and from the mobile communication terminal 10. The cloud 60 has a function of determining, when receiving data transmitted from the mobile communication terminal 10, whether or not the received data is a duplicate by referring to the data's sequence number, and discarding the duplicate data.

[First Embodiment]

A first embodiment of this invention is described with reference to FIG. 2 to FIG. 12.

Figure 2:
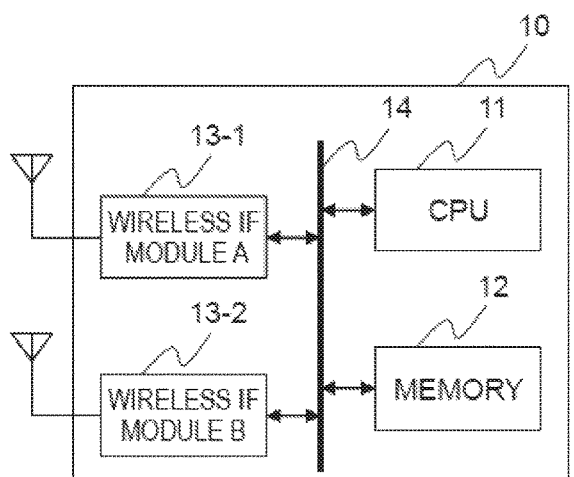
FIG. 2 is a diagram illustrating a physical configuration of a mobile communication terminal according to a first embodiment of this invention.

FIG. 2 is a diagram for illustrating the physical configuration of the mobile communication terminal 10 according to the first embodiment.

The mobile communication terminal 10 includes a CPU 11, a memory 12, a plurality of wireless IF modules 13-1 and 13-2, and a bus 14, which connects the components of the mobile communication terminal 10 to one another.

Figure 3:
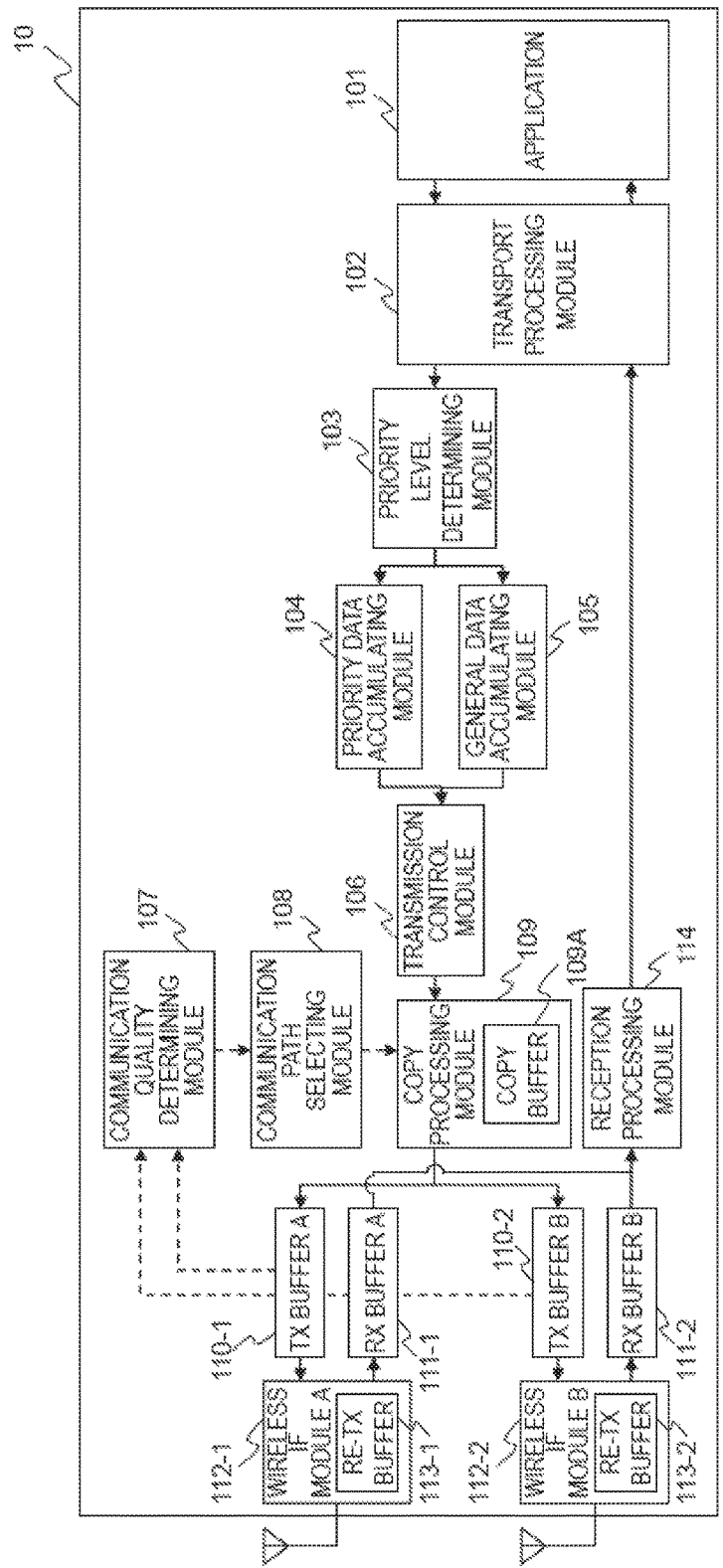
FIG. 3 is a function block diagram illustrating the mobile communication terminal according to the first embodiment of this invention.

The CPU 11 is a processor configured to execute programs stored in the memory 12. Function blocks of the mobile communication terminal 10, which are illustrated in FIG. 3, are implemented by the CPU 11 executing the programs. The memory 12 includes a ROM, which is a non-volatile storage element, and a RAM, which is a volatile storage element. The ROM stores an unchanged program (for example, BIOS) and the like. The RAM is a dynamic random access memory (DRAM) or other high-speed and volatile storage element, and temporarily stores a program executed by the CPU 11 and data used in the execution of the program. Programs executed by the CPU 11 are provided to the mobile communication terminal 10 via a removable media network, and are stored in the non-volatile memory 12, which is a non-transitory storage medium.

All or some of functions of the function modules implemented by programs may instead be implemented by hardware (for example, a field-programmable gate array).

The wireless IF modules 13-1 and 13-2 are IF apparatus that can separately be coupled to different wireless communication systems.

FIG. 3 is a function block diagram illustrating the mobile communication terminal 10.

The mobile communication terminal 10 includes an application 101, a transport processing module 102, a priority level determining module 103, a priority data accumulating module 104, a general data accumulating module 105, a transmission control module 106, a communication quality determining module 107, a communication path selecting module 108, a copy processing module 109, transmission buffers (tx buffers) 110, reception buffers (rx buffers) 111, wireless IF units 112, and a reception processing module 114.

The application 101 is software including a communication application program for providing an IoT service, and is configured to execute processing of the application layer, the presentation layer, and the session layer out of layers in the OSI reference model. The application 101 outputs data to be transmitted to an application program on the cloud 60 side to the transport processing module 102 in a case where such data exists, and data transmitted from an application program on the cloud 60 side is input to the application 101 from the transport processing module 102.

The transport processing module 102 is configured to process TCP/UDP data or other data in the transport layer of the OSI reference model. In a case where data is input from the application 101, the transport processing module 102 executes processing of the transport layer and outputs the processed data to the priority level determining module 103. In a case where data is input from the reception processing module 114, the transport processing module 102 executes processing of the transport layer and outputs the processed data to the application 101.

The priority level determining module 103 is configured to determine, in a case where transmission data is input from the transport processing module 102, the priority level of the transmission data by referring to header information of the input data and a priority level determining table 900. Header information of the transmission data is, for example, the type of measurement data.

The configuration of the priority level determining table 900 is described with reference to FIG. 12.

The priority level determining table 900 includes a data type 901 and a priority level 902. The priority level determining module 103 uses the priority level determining table 900 to determine the level of priority in the order of transmission from data type. In the case of the priority level determining table 900 shown in FIG. 12, for example, image data is given a high priority level in the order of transmission, and image data to be transmitted is accordingly input to the priority data accumulating module 104.

Temperature data, on the other hand, is given a "normal" priority level, and temperature data to be transmitted is accordingly input to the general data accumulating module 105. Transmission data input to the priority data accumulating module 104 is hereinafter referred to as "priority data", and transmission data input to the general data accumulating module 105 is hereinafter referred to as "general data".

The priority data accumulating module 104 is configured to accumulate priority data input from the priority level determining module 103. The general data accumulating module 105 is configured to accumulate general data input from the priority level determining module 103.

The transmission control module 106 is configured to output, to the copy processing module 109, data taken out of the priority data accumulating module 104 and data taken out of the general data accumulating module 105. Specifically, the transmission control module 106 determines whether or not there is priority data accumulated in the priority data accumulating module 104 and, in a case where the priority data accumulating module 104 has priority data accumulated therein, takes the priority data out of the priority data accumulating module 104, and outputs the priority data to the copy processing module 109. In a case where there is no priority data accumulated in the priority data accumulating module 104, the transmission control module 106 determines whether or not there is general data accumulated in the general data accumulating module 105. In a case where the general data accumulating module 105 has general data accumulated therein, the transmission control module 106 takes the general data out of the general data accumulating module 105, and inputs the general data to the copy processing module 109.

The communication quality determining module 107 is configured to manage the amounts of data accumulated in the transmission buffers 110 (buffer amounts) that are associated with all wireless interface (IF) units 112 installed in the mobile communication terminal 10, with the use of a transmission buffer information table 200.

An example of the configuration of the transmission buffer information table 200 is described with reference to FIG. 4. The transmission buffer information table 200 includes, for each wireless IF unit 112 that is associated with one of the transmission buffers, an IF ID 201 that is identification information of the wireless IF unit 112, and a buffer amount 202.

The transmission buffer information table 200 may additionally hold a condition of communication quality (whether the communication quality is high or low) in terms of delay that is determined from the transmission buffer amount. The default value in the initial condition (when the system is first put into use) is "high quality". This embodiment deals with an example in which data is transmitted on few routes (for example, single-route communication using one of the wireless IF units 112) when the communication quality is high, and data is transmitted on many routes (multi-route communication using a plurality of wireless IF units 112) when the communication quality is low.

A specific example of how the communication quality is determined in terms of delay is described. The communication quality determining module 107 obtains the buffer amount of each transmission buffer 110 for every buffer amount obtaining cycle T to update the value of the buffer amount 202. The cycle T is a value sufficiently smaller than an objective guaranteed delay and, in a case where the objective guaranteed delay is 50 milliseconds, is set to 5 milliseconds, for example. A buffer amount threshold α is set to determine that the communication quality is low in a case where the buffer amount of the transmission buffer 110 that is associated with the currently used wireless IF unit 112 is found to be equal to or more than the threshold α while the communication quality is high. The IF ID 201 that is associated with this transmission buffer 110 is then notified to the communication path selecting module 108. The threshold α can be determined by, for example, Expression 1.

$$\alpha = \text{objective guaranteed delay} \times \text{predicted wireless transmission rate} \quad (1)$$

The threshold α is 1 megabit when the objective guaranteed delay is 50 milliseconds and the predicted wireless transmission rate is 20 Mbps. A buffer amount threshold β is further set in order to determine whether the communication quality is high. The communication quality is determined as high in the case where the buffer amount of at least one of the transmission buffers 110 that are associated with a plurality of currently used wireless IF units 112 is found to be less than the threshold β after the buffer amounts are obtained X times in succession while the communication quality is low. The IF ID 201 that is associated with this transmission buffer 110 is then notified to the communication path selecting module 108.

In the case where the criterion is met by a plurality of transmission buffers 110, the IF ID 201 of one of the transmission buffers 110 (for example, the smallest ID) is selected and notified. The threshold β is a value smaller than α and is set to, for example, 0.2 megabit when α is 1 megabit. The obtainment count X is a value smaller than the objective guaranteed delay and is set to, for example, 3 when the objective guaranteed delay is 50 milliseconds and the obtaining cycle T is 5 milliseconds in order to avoid frequent switching. The threshold α, the threshold β, the buffer amount obtaining cycle T, and the buffer amount obtainment count X in this embodiment may be, for example, stationary values set by a system operator.

The communication path selecting module 108 is configured to determine, for every wireless IF unit 112 installed in the mobile communication terminal 10, whether or not the wireless IF unit 112 is used when the communication quality is low and whether or not the wireless IF unit 112 is in use at present, with the use of a wireless IF management table 300.

An example of the configuration of the wireless IF management table 300 is described with reference to FIG. 5. The wireless IF management table 300 includes, for each wireless IF unit 112 that is associated with one of the transmission buffers, an IF ID 301 that is identification information of the wireless IF unit 112, low quality-time specification information 302, and use specification information 303.

The IF ID 301 is similar to the IF ID 201, and the IF ID 301 of one wireless IF unit 112 associated with one of the transmission buffers is identification information of the wireless IF unit 112. The low quality-time specification information 302 is information indicating whether or not the wireless IF unit 112 identified by the IF ID 301 is specified as a wireless IF unit that is used when the communication quality is low, and is, for example, stationary information set by the system operator. The use specification information 303 is information indicating which wireless IF unit 112 is in use at present, and is updated in real time. Which wireless IF unit 112 is used when the system is first put into use is set by, for example, the system operator. After the system is put into use, the wireless IF unit 112 to be used is selected based on one of a low quality notification and a high quality notification from the communication quality determining module 107.

Figure 9:
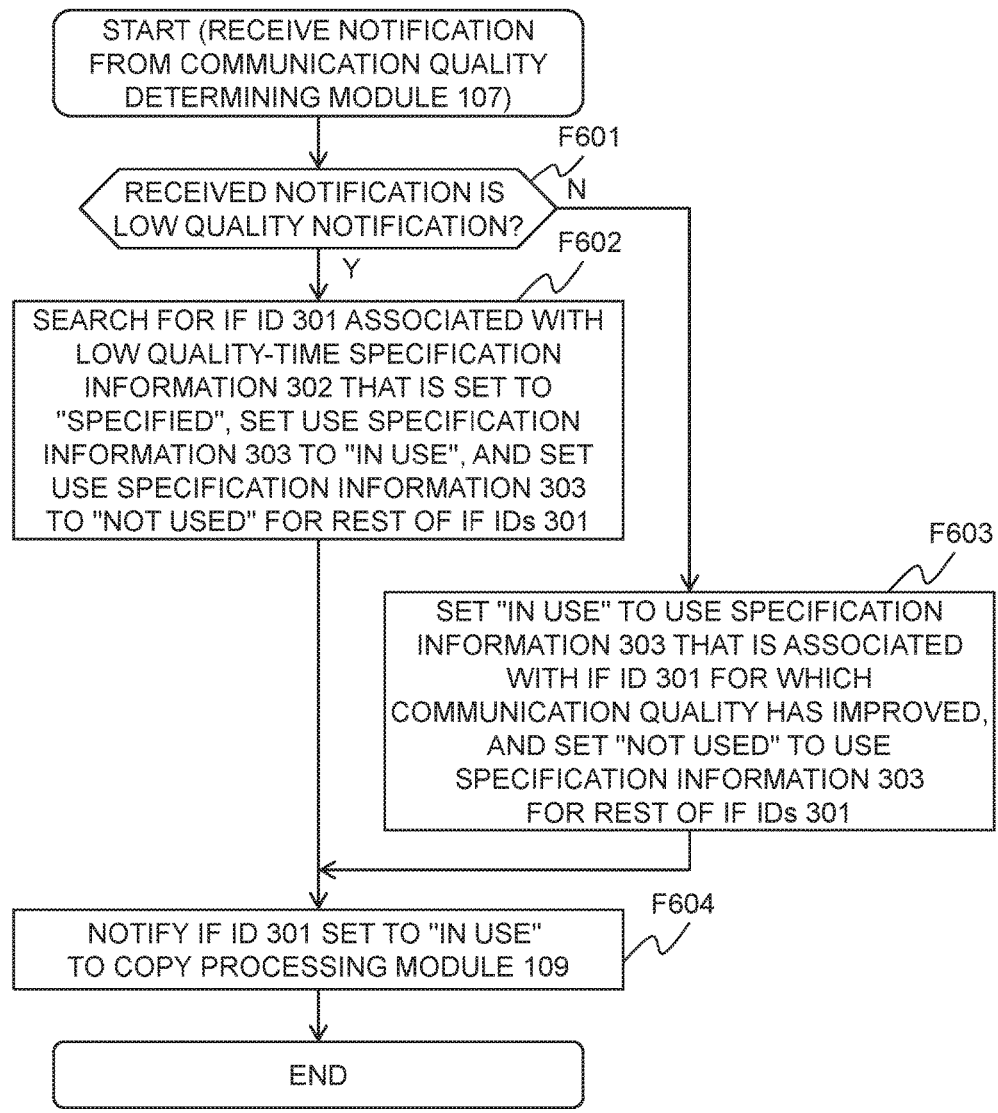
FIG. 9 is a flow chart of a wireless IF unit selecting processing executed by the communication path selecting module according to the first embodiment of this invention.

Wireless IF unit selecting processing executed by the communication path selecting module 108 is described with reference to FIG. 9.

The communication path selecting module 108 receives a notification from the communication quality determining module 107, and determines whether the received notification is the notification of low quality or high quality (Step F601). In a case where the received notification is a low quality notification, the IF ID 301 for which the low quality-time specification information 302 is set to "specified" is searched for, and the use specification information 303 is set to "in use" for the IF ID 301 found by the search. The use specification information 303 is set to "not used" for the IF ID 301 in an entry where the low quality-time specification information 302 is set to "not specified" (Step F602). The communication path selecting module 108 then proceeds to Step F604.

In a case where the notification received from the communication quality determining module 107 is a high quality notification, on the other hand, the IF ID 301 that is the same as an IF ID contained in the received notification of high quality is searched for, and the use specification information 303 is set to "in use" for the IF ID 301 found by the search. For other IF IDs than the found IF ID 301, the use specification information 303 is set to "not used" (Step F603), and the communication path selecting module 108 proceeds to Step F604.

In Step F604, the IF ID 301 for which the use specification information 303 is set to "in use" is notified to the copy processing module 109 in both the case where the received notification is a low quality notification and the case where the received notification is a high quality notification (Step F604).

The copy processing module 109 is configured to perform transmission data processing on transmission data that is input from the transmission control module 106, by following a copy processing information table 400. The copy processing module 109 includes a copy buffer 109A configured to store transmission data that is input from the transmission control module 106.

Figure 7:
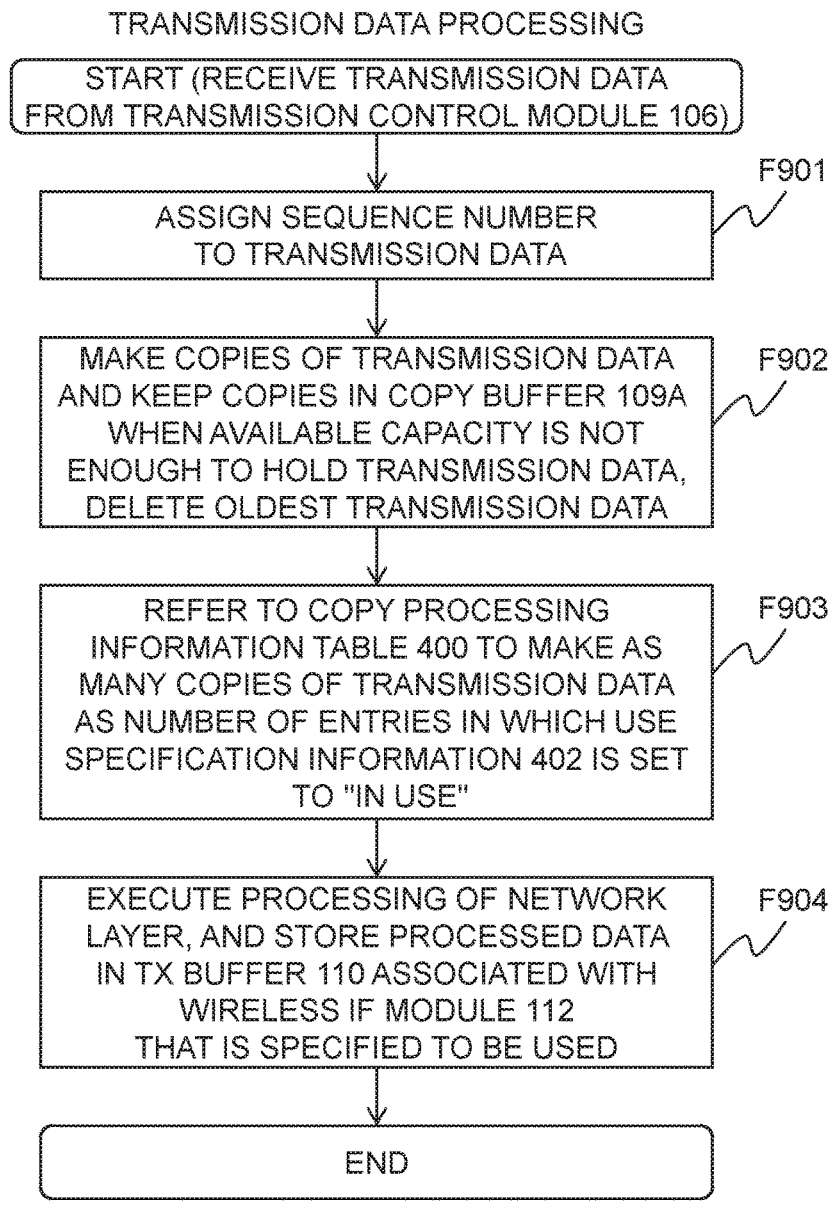
FIG. 7 is a flow chart of a transmission data processing executed by the copy processing module according to the first embodiment of this invention.

The transmission data processing executed by the copy processing module 109 is described with reference to FIG. 7.

The copy processing module 109 receives transmission data from the transmission control module 106, and assigns a sequence number to the transmission data (Step F901). The copy processing module 109 next makes a copy of the transmission data to which a sequence number has been assigned, and keeps a given amount of the new transmission data in the copy buffer 109A. In a case where the available capacity is not enough to hold the transmission data, the oldest transmission data is deleted (Step F902). Transmission data that the copy processing module 109 keeps in the copy buffer 109A is hereinafter referred to as "held data". The capacity of the copy buffer 109A to store held data is larger than the value of the threshold α described above. For example, the copy buffer 109A is given a capacity of 1.5 megabits when α is 1 megabit. The held data is data used for delay guarantee when the number of routes on which data is transmitted is increased (for example, in a case where single-route communication is switched to multi-route communication). This operation is described later.

Thereafter, the transmission data is copied by referring to the copy processing information table 400 (Step F903).

An example of the configuration of the copy processing information table 400 is described with reference to FIG. 6. The copy processing information table 400 includes, for each wireless IF unit 112 that is associated with one of the transmission buffers, an IF ID 401 that is an ID of the wireless IF unit 112, and use specification information 402.

The copy processing module 109 searches for the IF ID 401 that is the same as an IF ID contained in a high quality notification that is received from the communication path selecting module 108. The copy processing module 109 sets "in use" to the use specification information 402 that is associated with the IF ID 401 found by the search, and sets "not used" to the use specification information 402 that is associated with any other IF ID 401 than the found IF ID.

The copy processing module 109 makes as many copies of the transmission data as the number of IF IDs 401 for which the use specification information 402 is set to "in use" in the copy processing information table 400. The copy processing module 109 then executes processing of the network layer in the OSI reference model which is associated with the wireless IF units 112 that are identified by the IF IDs 401 for which the use specification information 402 is set to "in use", and outputs the copies of the transmission data to the transmission buffers 110 that are associated with the identified wireless IF units 112.

The transmission buffers 110 are queues in which transmission data input from the copy processing module 109 is accumulated. First in, first out (FIFO), for example, is used to input data to and output data from the transmission buffers 110. The capacity of each transmission buffer 110 is sufficiently large with respect to the threshold α described above, and is larger than the capacity of a retransmission buffer (re-tx buffer) 113 included in the relevant wireless IF unit 112 which is described later. For example, the capacity of each transmission buffer 110 is 2 megabits when the threshold α is 1 megabit.

The reception buffers 111 are queues in which reception data input from the wireless IF units 112 are accumulated.

The wireless IF units 112 have a function of executing processing of the data link layer and the physical layer in the OSI reference model. Each wireless IF unit 112 is associated with a different wireless communication system 40 and, in a case where transmission data is input from the relevant transmission buffer 110, executes processing of the data link layer and the physical layer, and transmits the processed data to the base station 20 that is available to the wireless IF unit 112 for communication. Each wireless IF unit 112 includes the retransmission buffer 113, which has a capacity of about several kilobytes necessary for processing of retransmitting a packet by a wireless protocol. In a case where reception data is input from the base stations 20, the wireless IF units 112 execute processing of the data link layer and the physical layer, and output the processed data to the reception buffers 111.

The reception processing module 114 is configured to perform processing of the network layer in the OSI reference model on reception data input from the reception buffers 111, and output the processed data to the transport processing module 102.

Figure 8A:
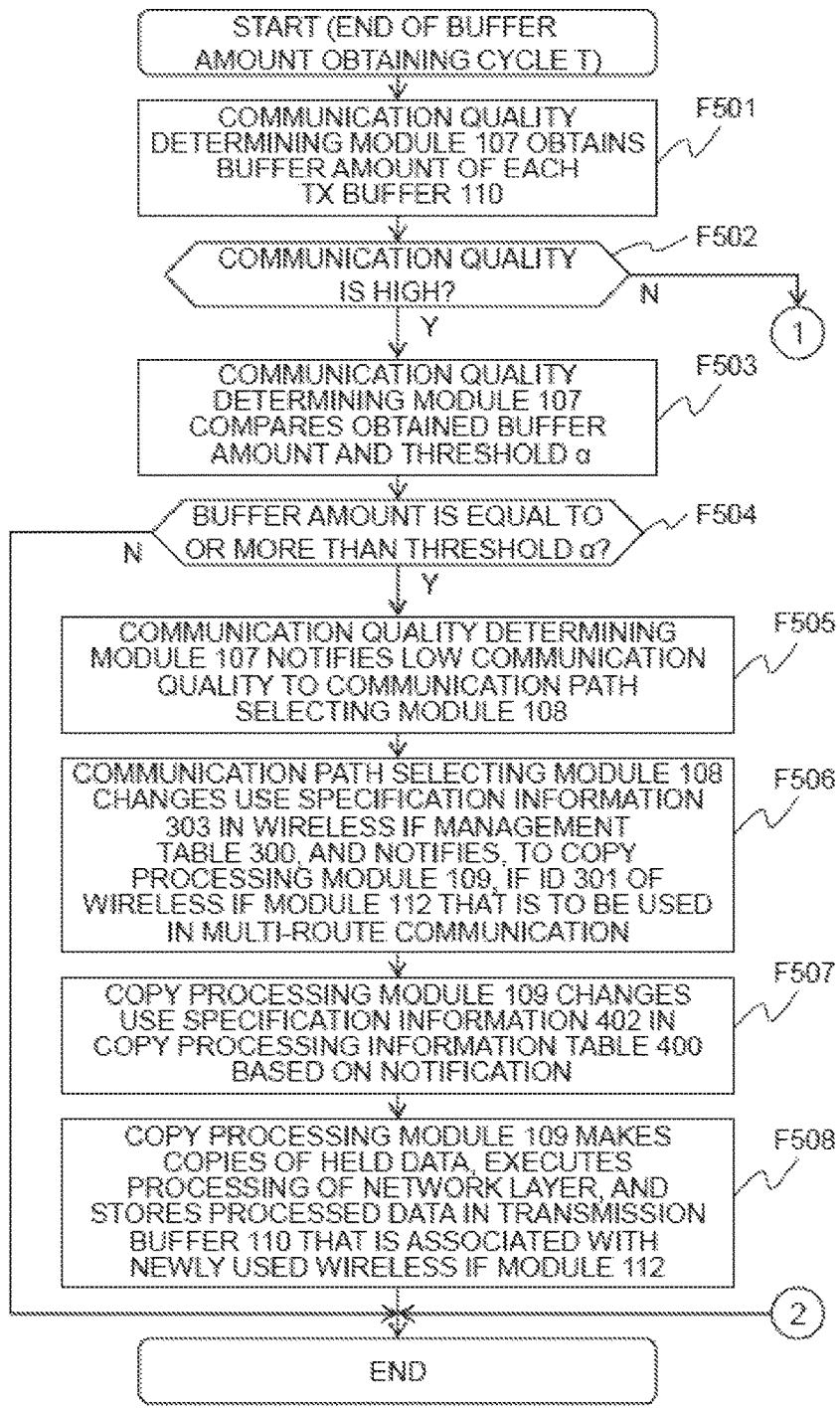
FIG. 8A and FIG. 8B are flow charts of a used wireless IF unit switching processing according to the first embodiment of this invention.
Figure 8B:
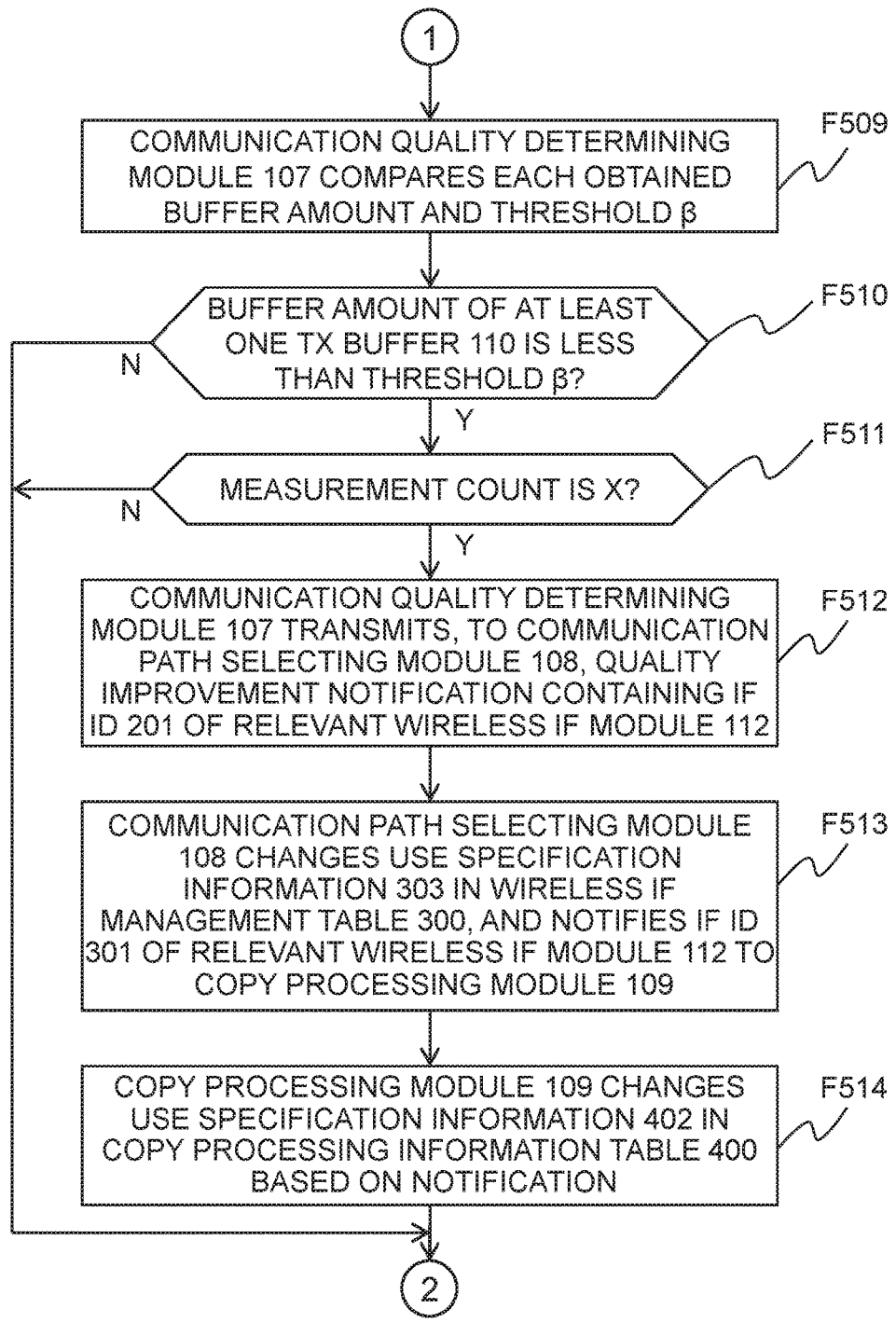
Figure 10:
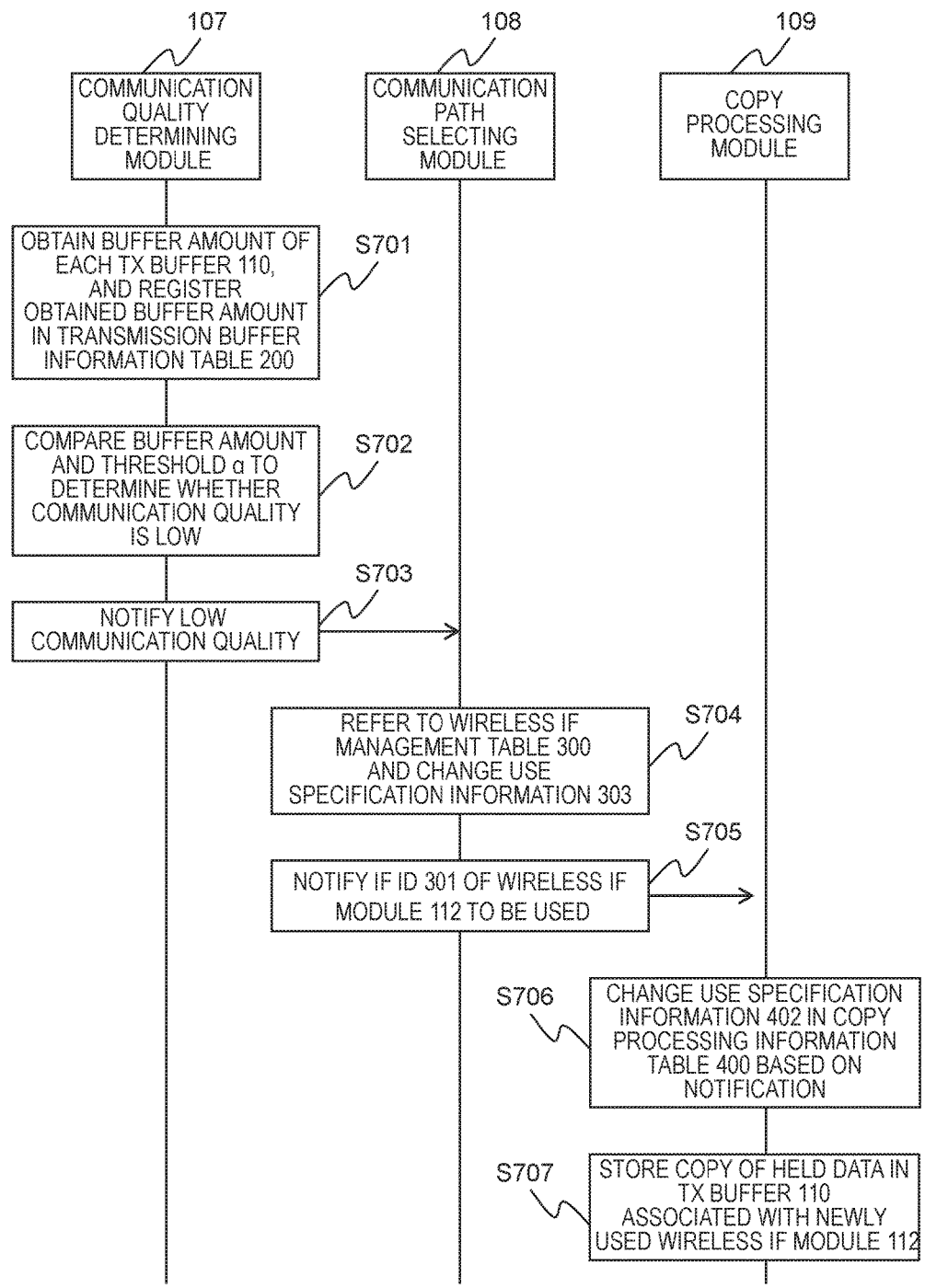
FIG. 10 is a diagram illustrating an operation sequence for switching from single-route communication to multi-route communication according to the first embodiment of this invention.
Figure 11:
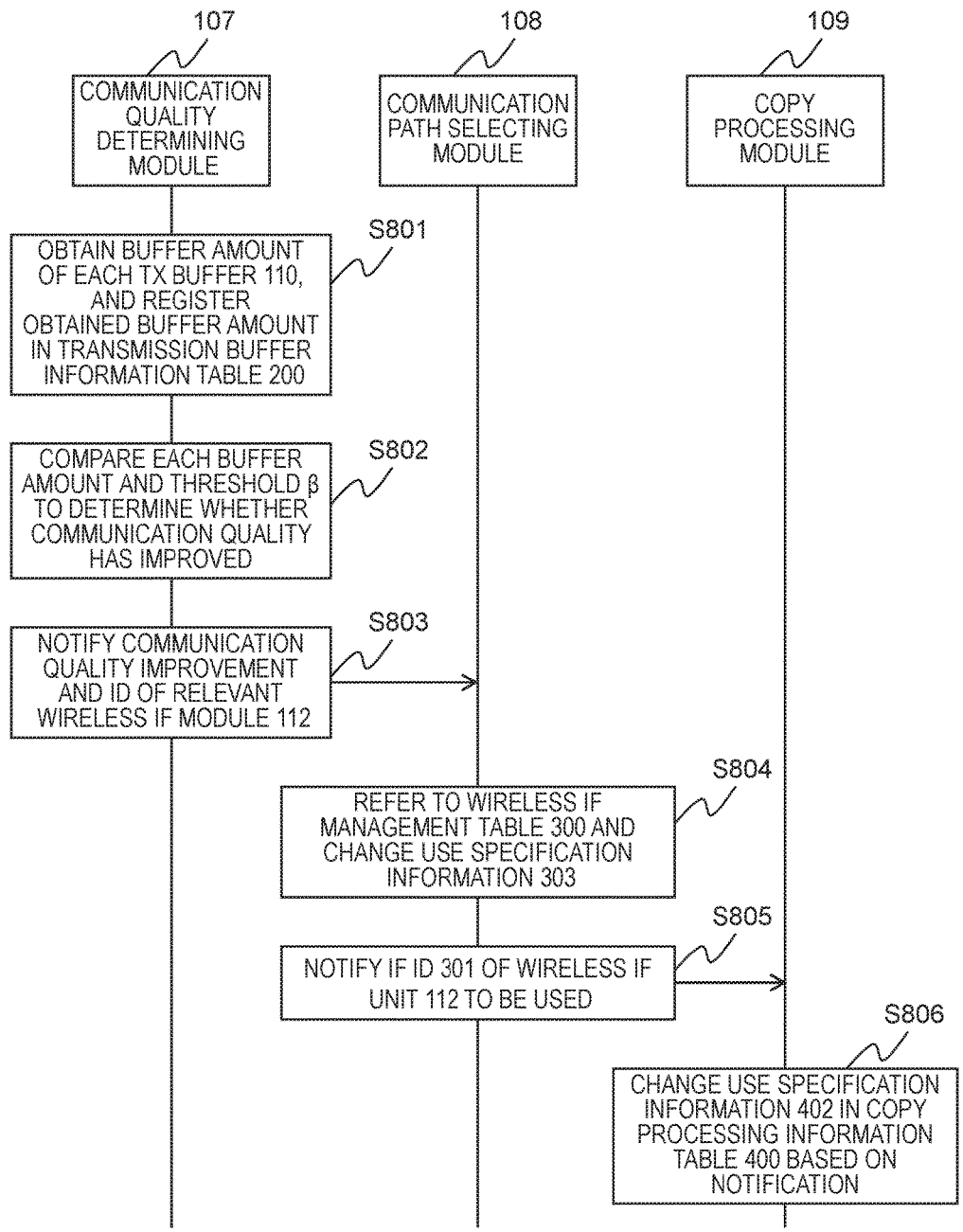
FIG. 11 is a diagram illustrating an operation sequence for switching from multi-route communication to single-route communication according to the first embodiment of this invention.

Processing of switching a wireless IF unit to be used is described next. FIG. 8A and FIG. 8B are flow charts for illustrating the used wireless IF unit switching processing. FIG. 10 is a diagram of an operation sequence for increasing the number of routes on which data is transmitted (for example, switching from single-route communication to multi-route communication). FIG. 11 is a diagram of an operation sequence for reducing the number of routes on which data is transmitted (for example, switching from multi-route communication to single-route communication).

The communication quality determining module 107 obtains the buffer amount of each transmission buffer 110 when the buffer amount obtaining cycle T ends, and updates the buffer amount 202 in the transmission buffer information table 200 (Step F501, Step S701, Step S801). The subsequent operation varies depending on whether the communication quality determined from the obtained buffer amount is high quality, in which case single-route communication is used, or low quality in which case multi-route communication is used (Step F502).

The operation of switching from single-route communication to multi-route communication is described first. When the communication quality is determined as high quality, the communication quality determining module 107 compares the obtained buffer amount and the threshold α (Step F503, Step S702). The processing is ended in a case where the buffer amount is less than the threshold α. In a case where the buffer amount is equal to or more than the threshold α, on the other hand, the processing proceeds to Step F505 (Step F504). In Step F505, the communication quality determining module 107 transmits a low quality notification to the communication path selecting module 108 (Step F505, Step S703).

The communication path selecting module 108 receives the low quality notification, sets "in use" to the use specification information 303 that is associated with the IF ID 301 for which the low quality-time specification information 302 is set to "specified", and sets "not used" to the use specification information 303 that is associated with the IF ID 301 for which the low quality-time specification information 302 is set to "not specified" (Step F506, Step S704). The communication path selecting module 108 then notifies to the copy processing module 109 the IF ID 301 for which the use specification information 303 is set to "in use" (Step F506, Step S705).

The copy processing module 109 receives the notification containing the IF ID, changes the use specification information 402 associated with the IF ID 401 that is the same as the notified IF ID to "in use" in the copy processing information table 400, and changes the use specification information 402 to "not used" for the rest of the IF IDs 401 (Step F507, Step S706). In order to transmit data from the wireless IF unit 112 that has not been used while the communication quality is high and that is to be newly used, the held data described above is read, processing of the network layer is executed, and the processed data is stored in the transmission buffer 110 that is associated with the newly used wireless IF unit 112 (Step F508, Step S707). The processing is then ended. The newly used wireless IF unit 112 reads the data stored in its associated transmission buffer 110, and transmits the read data.

The operation of switching from multi-route communication to single-route communication is described next. When the communication quality is determined as low quality, the communication quality determining module 107 compares each of a plurality of obtained buffer amounts to the threshold β (Step F509, Step S802). The processing is ended when every obtained buffer amount is equal to or more than the threshold β. When at least one obtained buffer amount is less than the threshold β, on the other hand, the processing proceeds to Step F511 (Step F510). In Step F511, the processing is ended when the number of times that the buffer amount of this transmission buffer 110 becomes a value less than the threshold β in succession is less than X. In a case where the number of times that the buffer amount of this transmission buffer 110 becomes a value less than the threshold β in succession is X, on the other hand, the communication quality determining module 107 transmits to the communication path selecting module 108 a high quality notification that contains the IF ID 201 of the wireless IF unit 112 that is associated with this transmission buffer 110 (Steps F511 and F512, Step S803).

The communication path selecting module 108 receives the high quality notification, sets "in use" to the use specification information 303 that is associated with the IF ID contained in the high quality notification, and sets "not used" to the use specification information 303 that is associated with any IF ID 301 that is not the notified IF ID (Step F513, Step S804). The communication path selecting module 108 then notifies to the copy processing module 109 the IF ID 301 for which the use specification information 303 is set to "in use" (Step F513, Step S805).

The copy processing module 109 receives the notification containing the IF ID, changes the use specification information 402 associated with the IF ID 401 that is the same as the notified IF ID to "in use" in the copy processing information table 400, and changes the use specification information 402 for the rest of the IF IDs 401 to "not used" (Step F514, Step S806). The processing is then ended.

The used wireless IF unit switching processing described above is an example in which one wireless IF unit 112 is used when the communication quality is high. However, the essence of this invention resides in reducing the number of routes on which data is transferred when the communication quality is high and increasing the number of routes on which data is transferred when the communication quality is low. This invention is therefore not limited to the numbers given in the embodiment as the numbers of wireless IF units used when the communication quality is high and when the communication quality is low. In other words, a plurality of wireless IF units 112 may be used when the communication quality is high.

Specifically, in the case where Y wireless IF units 112 are used when the communication quality is high, the communication quality is determined as low in a case where the buffer amounts of all transmission buffers 110 that are associated with the currently used wireless IF units 112 are found to be equal to or more than the threshold α while the communication quality is high. In the case where the number of times that the buffer amount becomes less than the threshold β in succession while the communication quality is low is X in one of the transmission buffers 110 that are associated with the currently used wireless IF units 112, the IF IDs of Y wireless IF units 112 in total, including the wireless IF unit 112 that is associated with this transmission buffer 110 may be selected.

In the case where a single wireless IF unit 112 can use a plurality of routes to transfer data, the number of routes on which data is transferred from this wireless IF unit 112 may be changed depending on whether the communication quality is high or low.

In the first embodiment, as described above, the quality of communication in terms of delay is determined based on the amount of data stored in a transmission buffer to increase the number of routes on which data is transmitted when the communication quality is low and to reduce the number of routes on which data is transmitted when the communication quality is high. Stable communication is accordingly accomplished when the communication quality is low, while the communication cost can be reduced as much as stable communication can be maintained when the communication quality is high. As a result, stable data communication between the cloud and the mobile communication terminal 10 is achieved.

[Second Embodiment]

A second embodiment of this invention is described next. The second embodiment has a feature that the above-mentioned thresholds for the buffer amount are changed dynamically depending on whether or not there is priority data. The description of the second embodiment is given with reference to FIG. 13 and FIG. 14 on differences from the first embodiment, and a description on parts that are the same as the first embodiment is omitted.

Figure 13:
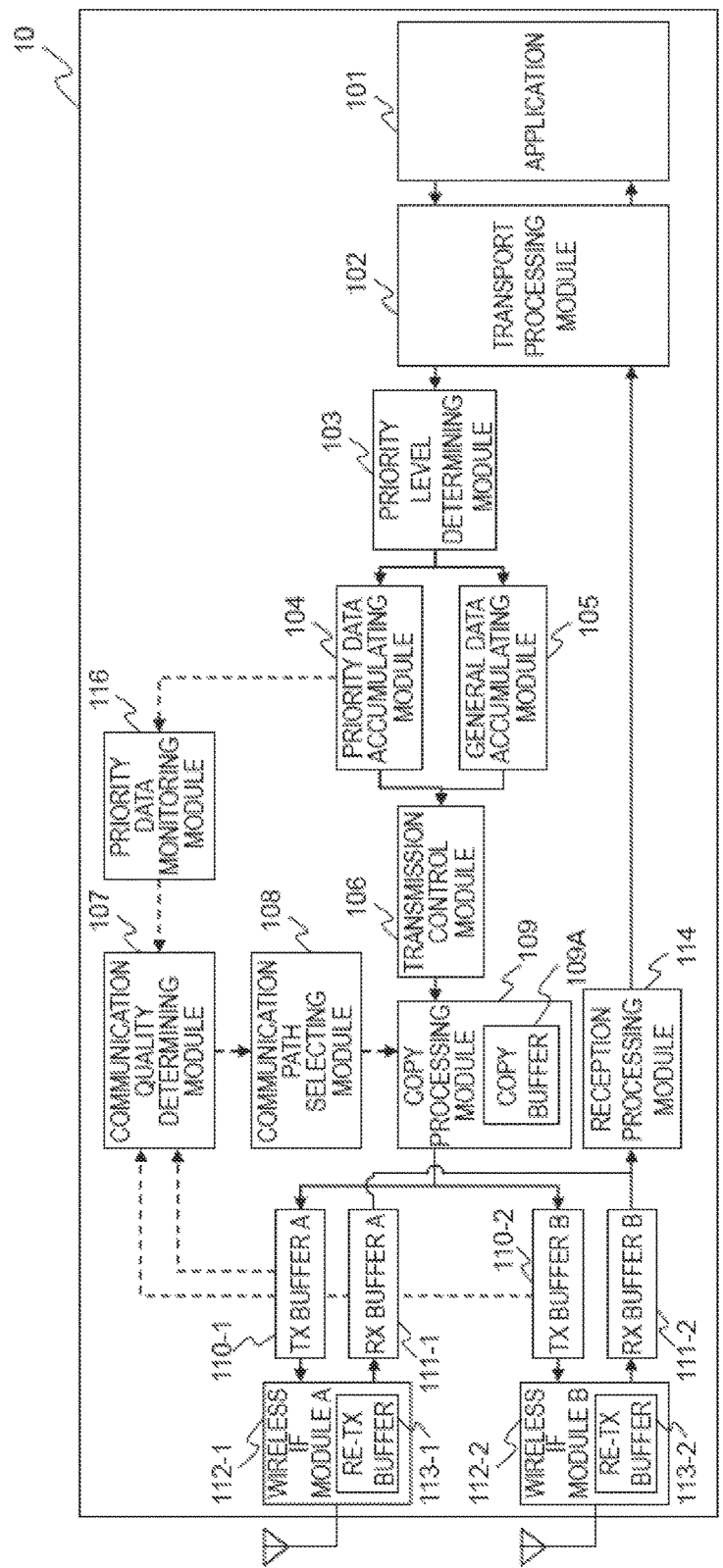
FIG. 13 is a function block diagram of a mobile communication terminal according to a second embodiment of this invention.

FIG. 13 is a function block diagram illustrating the mobile communication terminal 10 of the second embodiment.

The mobile communication terminal 10 of the second embodiment includes a priority data monitoring module 116 in addition to the components of the mobile communication terminal 10 of the first embodiment. The priority data monitoring module 116 is configured to monitor the priority data accumulating module 104 in a given cycle T2 to determine whether or not priority data is stored, to determine the values of the above-mentioned thresholds that are suited to the result of the determination, and to set the thresholds in the communication quality determining module 107.

Figure 14:
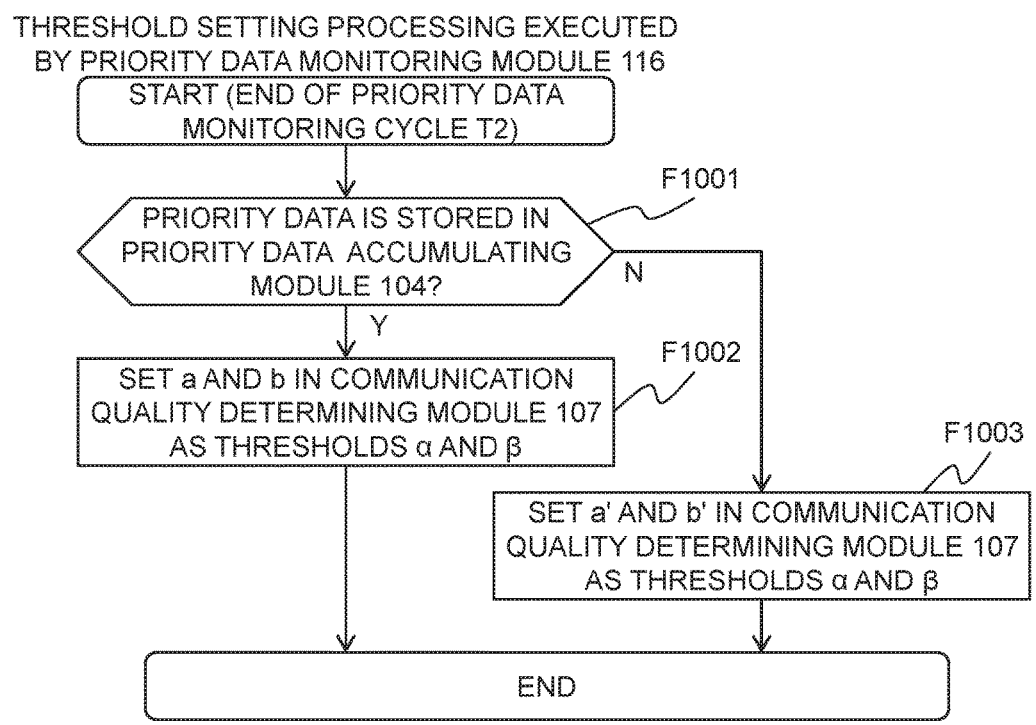
FIG. 14 is a flow chart of a threshold setting processing executed by a priority data monitoring module according to the second embodiment of this invention.

FIG. 14 is a flow chart of threshold setting processing that is executed by the priority data monitoring module 116.

When the monitoring cycle T2 ends, the priority data monitoring module 116 obtains information about whether or not there is priority data stored in the priority data accumulating module 104 (Step F1001). In a case where there is priority data stored in the priority data accumulating module 104, the priority data monitoring module 116 sets a and b in the communication quality determining module 107 as the threshold α and the threshold β, respectively. The processing is then ended. In a case where there is no priority data stored in the priority data accumulating module 104, on the other hand, the priority data monitoring module 116 sets a' and b' in the communication quality determining module 107 as the threshold α and the threshold β, respectively. The processing is then ended.

In the second embodiment, the value a' is smaller than a, and the value b is smaller than b'. This means that, when there is priority data, the communication quality determining module 107 determines that the communication quality has become low at a smaller buffer amount, and delay is thus guaranteed to be small. In this manner, the requirement that the application 101 installed in the mobile communication terminal 10 promptly transmit high priority data can be fulfilled. The thresholds may be set to values that vary depending on the requirement of an application program, and the thresholds may be stationary values set by the system operator, for example. In other words, the thresholds, which vary depending on the application program that transmits data, are dynamically changed in a case where the application program that transmits data changes.

[Third Embodiment]

A third embodiment of this invention is described next. The third embodiment has a feature that the above-mentioned thresholds for the buffer amount are changed dynamically depending on the amount of transmission data. The description of the third embodiment is given with reference to FIG. 15 and FIG. 16 on differences from the first embodiment, and a description on parts that are the same as the first embodiment is omitted.

Figure 15:
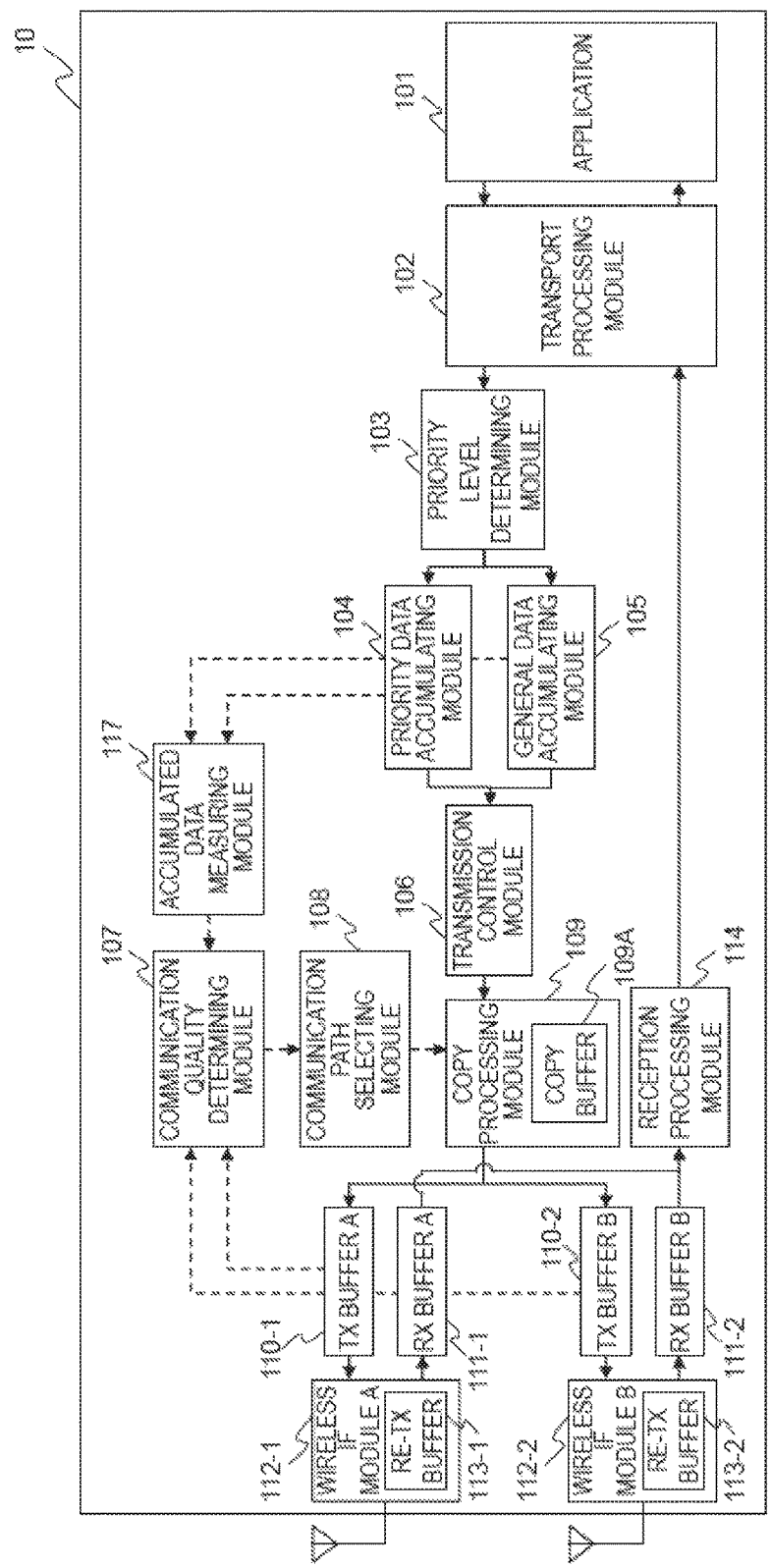
FIG. 15 is a function block diagram illustrating a mobile communication terminal according to a third embodiment of this invention.

FIG. 15 is a function block diagram illustrating the mobile communication terminal 10 of the third embodiment.

The mobile communication terminal 10 of the third embodiment includes an accumulated data measuring module 117 in addition to the components of the mobile communication terminal 10 of the first embodiment. The accumulated data measuring module 117 is configured to obtain the amount of data stored in the priority data accumulating module 104 and the amount of data stored in the general data accumulating module 105 by monitoring the accumulating modules 104 and 105 in a given cycle T3, to determine values of the above-mentioned thresholds that are suited to the obtained data amounts, and to set the thresholds in the communication quality determining module 107.

Figure 16:
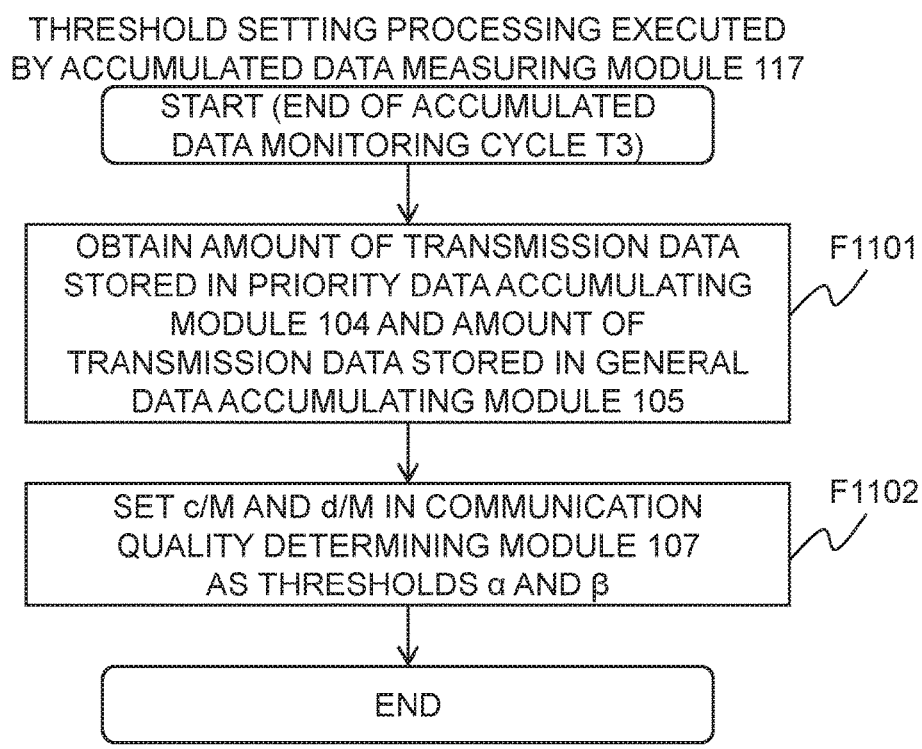
FIG. 16 is a flow chart of a threshold setting processing executed by an accumulated data measuring module according to the third embodiment of this invention.

FIG. 16 is a flow chart of threshold setting processing that is executed by the accumulated data measuring module 117.

When the monitoring cycle T3 ends, the accumulated data measuring module 117 obtains the amount of transmission data stored in the priority data accumulating module 104 and the amount of transmission data stored in the general data accumulating module 105. The sum of the obtained data amounts is given as M (Step F1101). The accumulated data measuring module 117 sets c/M and d/M in the communication quality determining module 107 as the threshold α and the threshold β, respectively (Step F1102). The processing is then ended.

In the third embodiment, c and b are constants and, in a case where the size of data to be transmitted is large, the communication quality determining module 107 determines that the communication quality has become low at a point where the buffer amount is small. In this manner, the requirement that the application 101 installed in the mobile communication terminal 10 promptly transmit large-sized data can be fulfilled. The constants c and d vary depending on the requirement of an application program, and are, for example, stationary values set by the system operator. While the sum of transmission data stored in the priority data accumulating module 104 and transmission data stored in the general data accumulating module 105 is given as M in the third embodiment, M may instead represent the amount of transmission data stored in one of the priority data accumulating module 104 and the general data accumulating module 105.

[Fourth Embodiment]

A fourth embodiment of this invention is described next. The fourth embodiment has a feature that the above-mentioned thresholds for the buffer amount are changed dynamically depending on a travel speed of the mobile communication terminal 10. The description of the fourth embodiment is given with reference to FIG. 17 and FIG. 18 on differences from the first embodiment, and a description on parts that are the same as the first embodiment is omitted.

Figure 17:
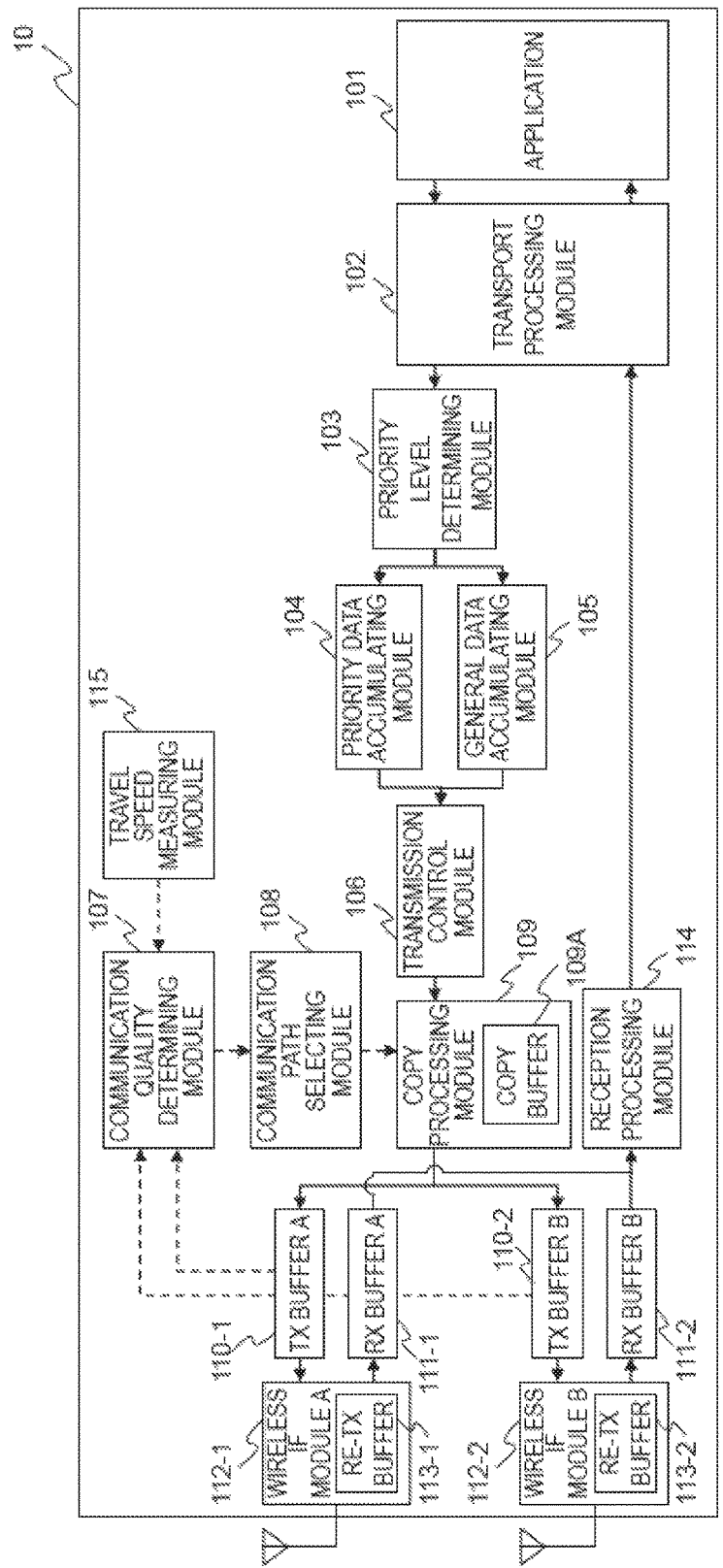
FIG. 17 is a function block diagram illustrating a mobile communication terminal according to a forth embodiment of this invention.

FIG. 17 is a function block diagram illustrating the mobile communication terminal 10 of the fourth embodiment.

The mobile communication terminal 10 of the fourth embodiment includes a travel speed measuring module 115 in addition to the components of the mobile communication terminal 10 of the first embodiment. The travel speed measuring module 115 is configured to measure a speed at which the mobile communication terminal 10 travels, to determine values of the above-mentioned thresholds that are suited to the travel speed, and to set the thresholds in the communication quality determining module 107. Travel speed measurement performed by the travel speed measuring module 115 is accomplished by using, for example, the global positioning system (GPS).

Figure 18:
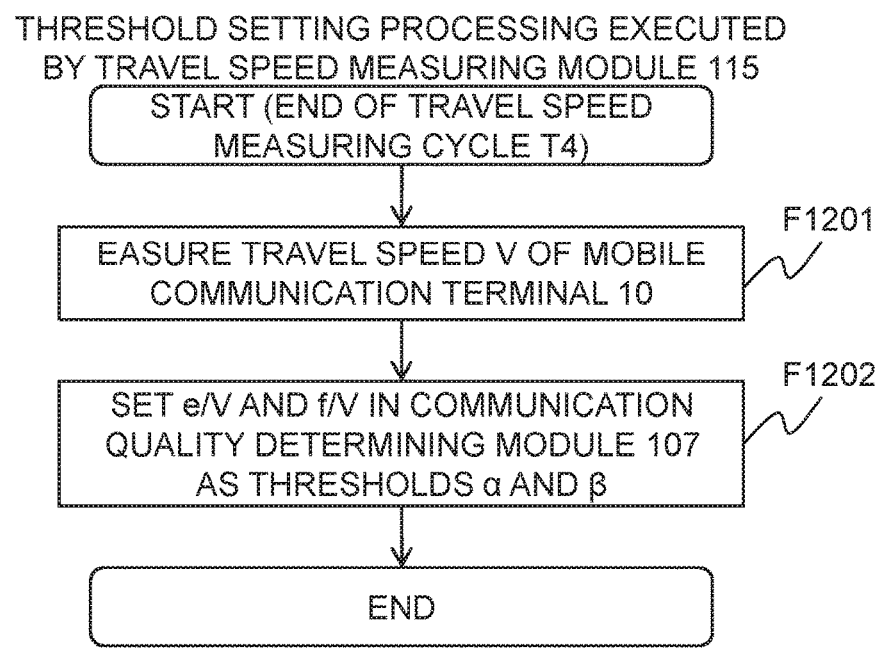
FIG. 18 is a flow chart of a threshold setting processing executed by a travel speed measuring module according to the forth embodiment of this invention.

FIG. 18 is a flow chart of threshold setting processing that is executed by the travel speed measuring module 115.

When a monitoring cycle T4 ends, the travel speed measuring module 115 obtains a travel speed V of the mobile communication terminal 10 (Step F1201). The travel speed measuring module 115 sets e/V and f/V in the communication quality determining module 107 as the threshold α and the threshold β, respectively (Step F1202). The processing is then ended.

In the fourth embodiment, e and f are constants and, in a case where the travel speed is high, the communication quality determining module 107 determines that the communication quality has become low at a point where the buffer amount is small. Delay is therefore guaranteed to be even smaller. This means that, in the case where the application 101 installed in the mobile communication terminal 10 is an application program for realizing a remote driving service, safety can be ensured by quick feedback control from the cloud in a case where a controlled automobile traveling at high speed. The constants e and f vary depending on the requirement of an application program, and are, for example, stationary values set by the system operator.

The second embodiment to the fourth embodiment deal with examples of changing the thresholds that are used to determine the communication quality. Two or more of the examples may be combined to be applied to the mobile communication terminal 10.

According to the embodiments of this invention, as described above, the mobile communication terminal 10 includes the transmission buffers 110 configured to store data to be transmitted, the communication quality determining module 107 configured to determine the communication quality of a plurality of wireless communication systems 40 based on the result of comparison between the amounts of data stored in the transmission buffers 110 and given thresholds, the communication path selecting module 108 configured to control the number of wireless communication systems used to transmit data based on the result of the communication quality determination, and at least one wireless IF unit 112 configured to transmit data to the wireless base stations 20 via the selected number of wireless communication systems 40. Stable data communication can thus be accomplished while keeping communication cost low.

The communication path selecting module 108 exerts control so that the number of wireless communication systems 40 used to transmit data increases when the communication quality is determined as low, and so that the number of wireless communication systems 40 used to transmit data decreases in a case where the communication quality is determined as high. Stable communication is therefore accomplished by increasing the number of routes used in multi-route communication when the communication quality is low, while the communication cost can be reduced as much as stable communication can be maintained when the communication quality is high.

The wireless IF units 112 include a plurality of wireless interfaces configured to separately communicate to and from the wireless base stations 20 of different wireless communication methods or of different telecommunication carriers via a plurality of wireless communication systems 40. Stable data communication can therefore be accomplished while using a plurality of routes different from one another in communication quality.

When transmitting data with the use of a plurality of wireless communication systems 40, the mobile communication terminal 10, which includes the copy processing module 109 configured to make copies of the data to be transmitted, is capable of transmitting the same data on a plurality of routes, and therefore accomplishes stable data communication.

The copy processing module 109 includes the copy buffer 109A configured to store a given amount of copy source data. In a case where the communication path selecting module 108 newly selects a wireless interface through which data is to be transmitted, the copy processing module 109 reads copy source data stored in the copy buffer 109A and sends the read data to the newly selected wireless interface. Already transmitted data can therefore be retransmitted on another route when the communication quality becomes low.

A condition for determining the communication quality by the communication quality determining module 107 is changed dynamically based on the requirement of the application 101 installed in the mobile communication terminal 10. The need for multi-route communication can therefore be determined more accurately than when a fixed threshold is used. Wasteful use of multi-route communication can therefore be prevented, and thus the communication cost can be reduced.

A condition for determining the communication quality by the communication quality determining module 107 is changed dynamically based on the amounts of data stored in the transmission buffers 110. Data stored in the buffers can therefore be transmitted in a prompt manner, thereby accomplishing data transmission with a small delay.

A condition for determining the communication quality by the communication quality determining module 107 is changed dynamically based on the priority levels of data stored in the transmission buffers 110. Data that is to be transmitted preferentially can therefore be transmitted with a small delay.

A condition for determining the communication quality by the communication quality determining module 107 is changed dynamically based on the travel speed of the mobile communication terminal 10. Data transmission with a small delay is therefore accomplished in high speed driving where prompt feedback is needed, thereby ensuring safety of a mobile object.

Each wireless IF unit 112 includes the retransmission buffer 113 necessary for the processing of retransmitting a packet by a wireless protocol in the data link layer or the physical layer, and the relevant transmission buffer 110 stores data to be transmitted from the wireless IF unit 112. Route count control suited to a request of an application program can therefore be executed in upper layers of the OSI reference model.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A wireless communication terminal, which is capable of coupling to a plurality of wireless communication systems, comprising:
   a transmission buffer configured to store data to be transmitted;
   a determination module configured to determine communication quality of the plurality of wireless communication systems based on a result of comparison between an amount of data stored in the transmission buffer and a given threshold;
   a selection module configured to control a number of wireless communication systems to be used to transmit data, based on a result of the determination of the communication quality;

a copy processing module configured to make copies of data to be transmitted in a case where data is transmitted via the plurality of wireless communication systems: and at least one wireless interface configured to transmit data via the controlled number of wireless communication systems, wherein the at least one wireless interface includes a plurality of wireless transceivers configured to separately communicate to and from wireless base stations of different wireless communication methods or of different telecommunication carriers via the plurality of wireless communication systems, the copy processing module comprises a copy buffer configured to hold a given amount of copy source data, and the copy processing module is configured to read the copy source data stored in the copy buffer and to send the read data to the newly selected wireless interface in a case where the selection module newly selects a wireless interface to be used to transmit data.

2. The wireless communication terminal according to claim 1, wherein the selection module is configured to:
control to increase the number of wireless communication systems to be used to transmit data in a case where the communication quality is determined as low; and
control to decrease the number of wireless communication systems to be used to transmit data in a case where the communication quality is determined as high.

3. The wireless communication terminal according to claim 1, wherein a condition for determining the communication quality by the determination module is changed dynamically based on at least one of a requirement of an application program that is installed in the wireless communication terminal, the amount of data stored in the transmission buffer, a priority level of data stored in the transmission buffer, or a travel speed of the wireless communication terminal.

4. The wireless communication terminal according to claim 1,
wherein the at least one wireless interface includes a retransmission buffer necessary for processing of retransmitting a packet by a wireless protocol in one of a data link layer and a physical layer, and
wherein the transmission buffer is configured to store data to be transmitted from the at least one wireless interface.

5. A wireless communication system, comprising:
a wireless communication terminal capable of coupling to a plurality of wireless communication systems; and
a wireless base station configured to receive data from the wireless communication terminal and transmit the received data to a computer system,
the wireless communication terminal including:
a transmission buffer configured to store data to be transmitted;
a determination module configured to determine communication quality of the plurality of wireless communication systems based on a result of comparison between an amount of data stored in the transmission buffer and a given threshold;
a selection module configured to control a number of wireless communication systems to be used to transmit data, based on a result of the determination of the communication quality; and
at least one wireless interface configured to transmit data to the wireless base stations via the controlled number of wireless communication systems, wherein
the at least one wireless interface includes a plurality of wireless transceivers configured to separately communicate to and from wireless base stations of different wireless communication methods or of different telecommunication carriers via the plurality of wireless communication systems,
the wireless communication terminal further comprises a copy processing module configured to make copies of data to be transmitted in a case where data is transmitted via the plurality of wireless communication systems,
the copy processing module comprises a copy buffer configured to hold a given amount of copy source data, and
the copy processing module is configured to read the copy source data stored in the copy buffer and to send the read data to the newly selected wireless interface in a case where the selection module newly selects a wireless interface to he used to transmit data.

6. The wireless communication system according to claim 5, the selection module is configured to:
control to increase the number of wireless communication systems to be used to transmit data in a case where the communication quality is determined as low; and
control to decrease the number of wireless communication systems to be used to transmit data in a case where the communication quality is determined as high.

7. The wireless communication system according to claim 5, wherein a condition for determining the communication quality by the determination module is changed dynamically based on at least one of a requirement of an application program that is installed in the wireless communication terminal, the amount of data stored in the transmission buffer, a priority level of data stored in the transmission buffer, or a travel speed of the wireless communication terminal.

8. The wireless communication system according to claim 5,
wherein the at least one wireless interface includes a retransmission buffer necessary for processing of retransmitting a packet by a wireless protocol in one of a data link layer and a physical layer, and
wherein the transmission buffer is configured to store data to be transmitted from the at least one wireless interface.

* * * * *